United States Patent
Lindsey (10) Patent No.: US 6,434,184 B2
(45) Date of Patent: *Aug. 13, 2002

(54) ORTHOGONAL FREQUENCY HOPPING USING SKIP ZONES

(75) Inventor: Mark J. Lindsey, San Diego, CA (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/223,680

(22) Filed: Dec. 30, 1998

(51) Int. Cl.[7] .......................... H04B 15/00; H04K 1/00; H04L 27/30
(52) U.S. Cl. ...................................... 375/135; 375/132
(58) Field of Search ................................ 375/132, 133, 375/134, 135; 455/446, 450, 452, 561, 447; 370/328, 329, 343, 302

(56) References Cited

U.S. PATENT DOCUMENTS

| 5,099,495 A | * | 3/1992 | Mikoshiba et al. |
| 5,121,408 A | * | 6/1992 | Cai et al. |
| 5,193,102 A | * | 3/1993 | Meidan et al. |
| 5,224,121 A | * | 6/1993 | Schorman |
| 5,353,341 A | * | 10/1994 | Gillis et al. |
| 5,379,047 A | * | 1/1995 | Yokev et al. |
| 5,381,443 A | * | 1/1995 | Borth et al. |
| 5,394,433 A | * | 2/1995 | Bantz et al. |
| 5,396,541 A | * | 3/1995 | Farwell et al. |
| 5,408,496 A | * | 4/1995 | Ritz et al. |
| 5,438,332 A | * | 8/1995 | Adam et al. |
| 5,454,010 A | * | 9/1995 | Leveque |
| 5,550,895 A | * | 8/1996 | Burson et al. |
| 5,568,510 A | * | 10/1996 | Tam |
| 5,638,399 A | * | 6/1997 | Schuchman et al. |
| 5,722,059 A | * | 2/1998 | Campana, Jr. |
| 5,748,669 A | * | 5/1998 | Yada |
| 6,049,561 A | * | 4/2000 | Pezzlo et al. ................ 375/132 |

* cited by examiner

Primary Examiner—Chi Pham
Assistant Examiner—Phuong Phu
(74) Attorney, Agent, or Firm—Blakely, Sokoloff, Taylor & Zafman LLP (57) ABSTRACT

The present invention is a method and apparatus for providing orthogonal frequency hopping for users in a communication system. The users have user bandwidths allocated on a frequency band. A jitter space is provided with a jitter bandwidth on the allocated frequency band. If at least one of the user bandwidths is larger than the jitter space, a skip zone is determined for at least one of the user bandwidths. The skip zone is unoccupied by a starting hop of the user bandwidths when the user bandwidths are shifted in a frequency hopping.

21 Claims, 8 Drawing Sheets

ORTHOGONAL FREQUENCY HOPPING USING SKIP ZONES

BACKGROUND

1. Field of the Invention

This invention relates to communication systems. In particular, the invention relates to frequency planning and bandwidth allocation in a communication system.

2. Description of Related Art

In a typical communication system, a number of users are allocated bandwidths in a frequency band for signal transmission and reception. A transponder, such as a satellite, receives signals transmitted from transmitter communication units (CU's) and re-transmits the received signals to receiver CU's. A communication system may include a number of transponders, each operating at a different frequency band.

There are a number of performance requirements involving the allocation of user bandwidths. First, the allocation should be efficient, i.e., the allocation preferably supports as many users as possible without wasting bandwidth. Second, the allocation should be such that adjacent channel interference (ACI) is minimized as much as possible to reduce noise affecting signal quality. Third, the allocation should be able to accommodate a dynamic environment when users are added or removed in the system. Fourth, each CU should be able to process data as fast as possible without incurring costs. Currently, there is no system that can achieve all of the above requirements.

In a typical communication system that involves a large number of users, the frequency allocation or planning is performed in advance and each user is assigned a predetermined bandwidth. To avoid channel fading and to increase data security, the user operating frequencies are changed periodically. A well-known technique to do this is the frequency hopping method.

In the frequency hopping technique, the user frequencies are hopped at a randomly generated hop frequency at predetermined time intervals. To avoid interference, each user CU calculates its hop frequency such that the resulting new frequency is different from other users. This calculation requires each user CU to consider all the other user frequencies. The data storage and processing time for each CU are therefore extensive, resulting in degraded performance and expensive CU design.

Therefore there is a need in the technology to provide frequency allocation and planning to achieve the above performance requirements in a frequency hopping communication system.

SUMMARY

The present invention is a method and apparatus for providing orthogonal frequency hopping for users in a communication system. The users have user bandwidths allocated on a frequency band. A jitter space is provided with a jitter bandwidth on the allocated frequency band. If at least one of the user bandwidths is larger than the jitter space, a skip zone is determined for at least one of the user bandwidths. The skip zone is unoccupied by a starting hop of the user bandwidths when the user bandwidths are shifted in a frequency hopping.

In a preferred embodiment, a communication unit provides an operational frequency in the frequency band. The communication unit includes a random generator, a network implementation plan (NIP) parameter storage, and a frequency generator. The random generator provides a random index when a frequency hopping occurs. The NIP parameter storage provides orthogonal frequency hopping (OFH) parameters. The frequency generator is coupled to the random generator to generate the operational frequency based on the random index. The operational frequency is orthogonal to other user frequencies in the frequency band.

BRIEF DESCRIPTION OF THE DRAWINGS

The features and advantages of the present invention will become more apparent from the following detailed description of the present invention in which.

DESCRIPTION

The present invention is a method and apparatus for planning and allocating bandwidths for users in a communication system. Users are allocated bandwidths according to their data rates. Skip zones are determined to allow an orthogonal frequency hopping. The technique provides efficient bandwidth allocation and fast processing time because each user's communication unit does not need to consider bandwidths of the other communication units.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

| List of acronyms | |
|---|---|
| ACI: | adjacent channel interference |
| BOP: | bandwidth occupancy plan |
| BW: | bandwidth |
| CU: | communication unit |
| FDMA: | frequency division multiple access |
| FZ: | forbidden zone |
| LDR: | low data rate |
| MDR: | medium data rate |
| NCT: | network control terminal |
| NIP: | network implementation plan |
| OFH: | orthogonal frequency hopping |

-continued

List of acronyms

| | |
|---|---|
| OFHMA: | orthogonal frequency hopped multiple access |
| RF: | radio frequency |
| SPC: | system planning computer |
| SZ: | skip zone |
| VZ: | valid zone |

Figure 1:
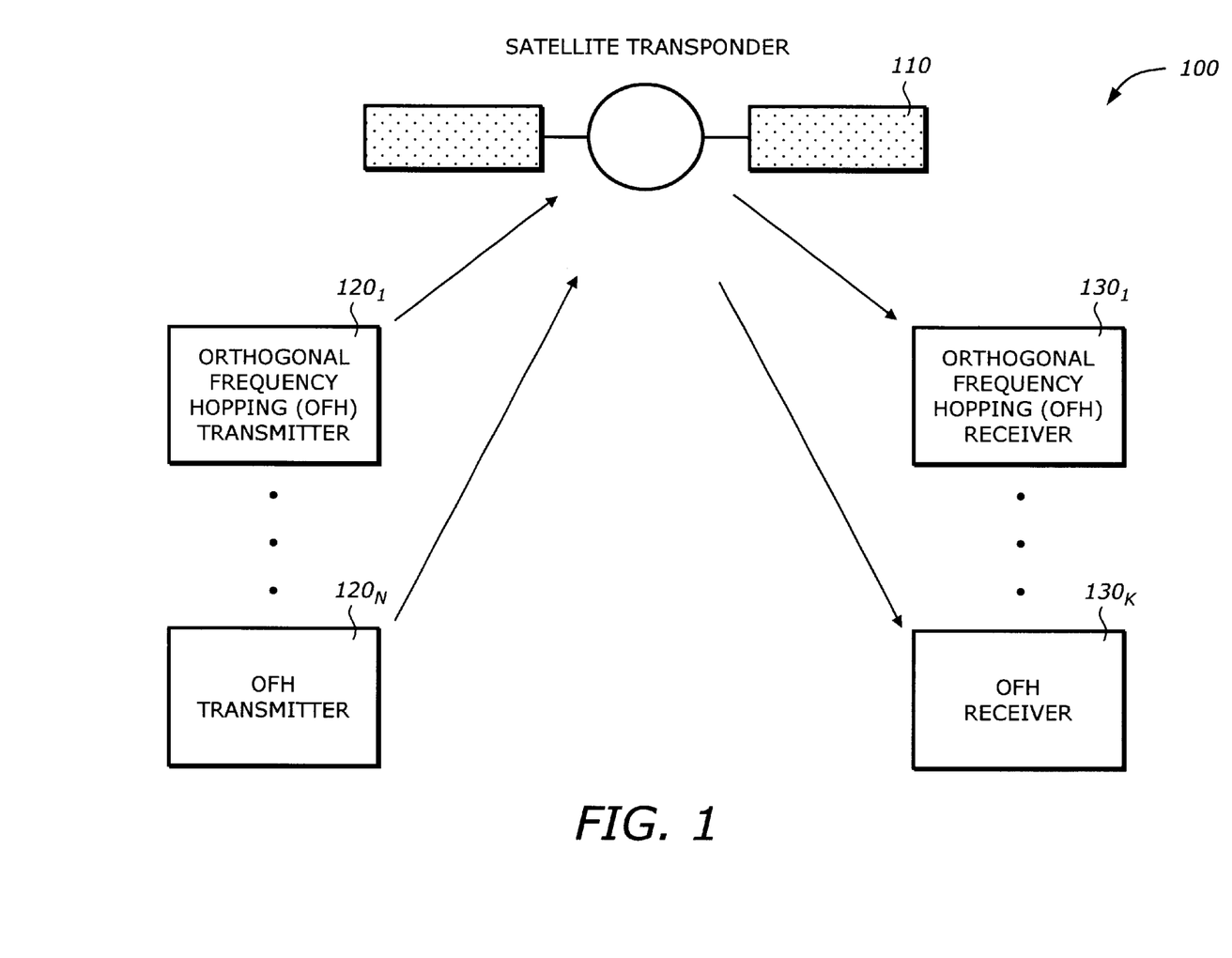
FIG. 1 is a diagram illustrating a communication system in which a preferred embodiment of the invention can be practiced.

FIG. 1 is a diagram illustrating a communication system 100 in which a preferred embodiment of the invention can be practiced. The communication system 100 includes a transponder 110, N orthogonal frequency hopping (OFH) transmitters $120_1$ to $120_N$, and K OFH receivers $130_1$ to $130_K$. For clarity, only one transponder is used. The technique in the present invention is applicable for a communication system having multiple transponders.

Transponder 110 is a radio frequency (RF) unit that receives RF signal transmitted by any one or all of the OFH transmitters $120_1$ to $120_N$ and transmits the received signals to the OFH receivers $130_1$ to $130_K$. In a preferred embodiment, the transponder 110 is located in a communication satellite.

Each of the OFH transmitters $120_1$ to $120_N$ transmits a signal within its allocated frequency bandwidth. The transmitter frequency bandwidths are allocated in the network implementation plan (NIP). The frequency planning is based on an orthogonal frequency hopping (OFH) process that provides efficient usage of bandwidth.

Each of the OFH receivers $130_1$ to $130_K$ receives a signal generated by the transponder 110 within its allocated frequency bandwidth. The receiver frequency bandwidths are also allocated in the NIP and therefore bandwidths are efficiently used. Each of the OFH receivers also uses the OFH process to receive the signal according to the corresponding transmitter bandwidth.

Each of the communication units, including the transmitters $120_1$ to $120_N$ and receivers $130_1$ to $130_N$, uses the OFH process without having to consider bandwidths of other communication units thanks to the orthogonality of the allocated bandwidths. Therefore, the processing time to generate or receive signal in each communication unit is very short. In addition, the implementation of the communication unit is simple, reducing cost and increasing reliability.

Figure 2:
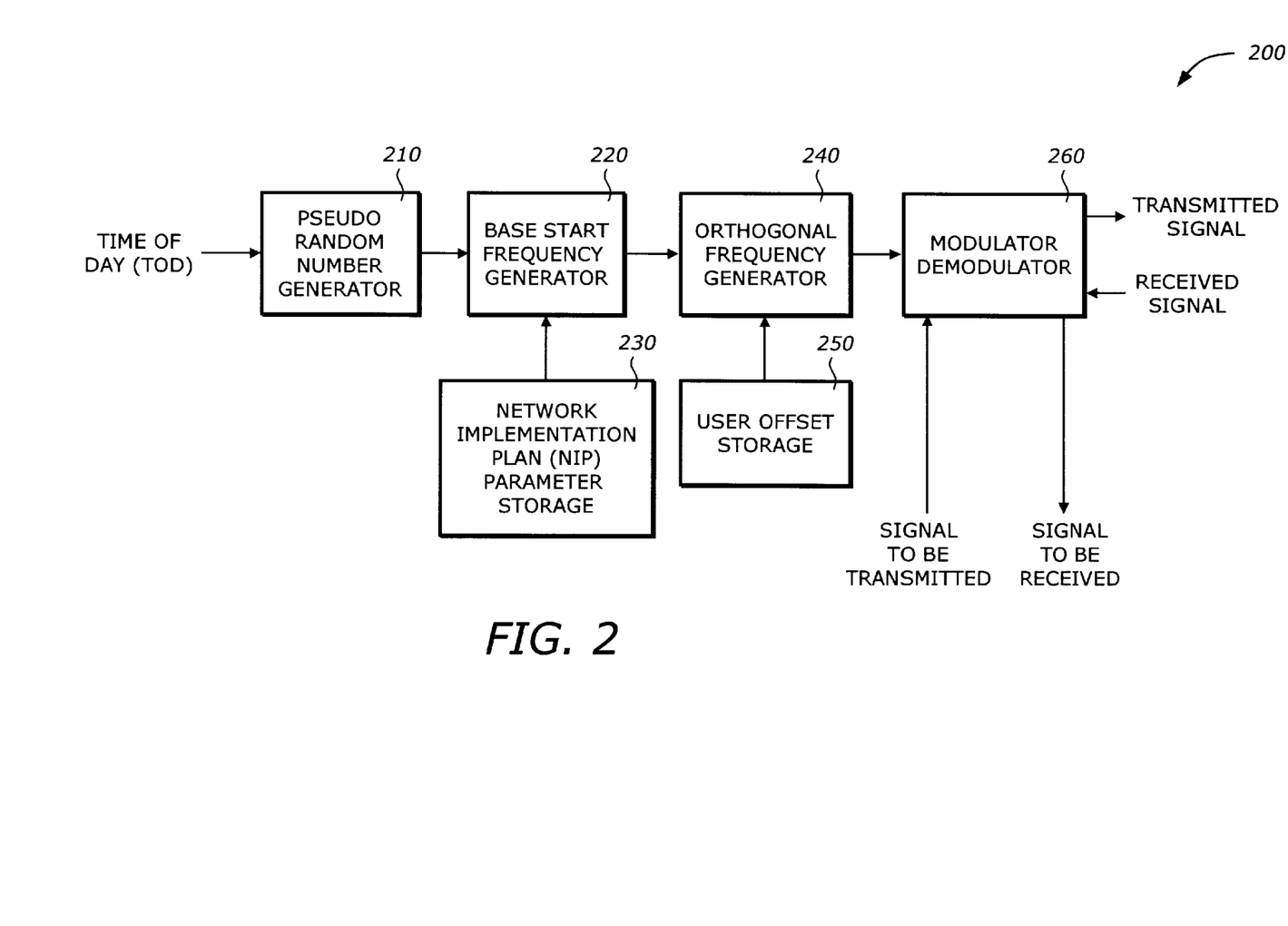
FIG. 2 is a diagram illustrating a communication unit using orthogonal frequency hopping (OFH) signal generator according to a preferred embodiment of the invention.

FIG. 2 is a diagram illustrating a communication unit (CU) 200 using orthogonal frequency hopping (OFH) signal generator according to a preferred embodiment of the invention. The communication unit 200 includes a pseudo-random number generator (PRNG) 210, a base start frequency generator 220, a NIP parameter storage 230, an orthogonal frequency generator 240, a user offset storage 250, and a modulator/demodulator 260.

The PRNG 210 receives a unique triggering signal to generate a sequence of pseudo random numbers. In a preferred embodiment, the triggering signal is derived from the time of day (TOD). The base start frequency generator 220 receives the random number as generated by the PRNG 210 and parameters from the NIP parameter storage 230 to generate the base frequency. The NIP parameter storage 230 stores parameters that are used for frequency hopping. These parameters include start and stop skip zones, and the forbidden zones. The significance of the skip and forbidden zones will be described later.

The orthogonal frequency generator 240 receives the base frequency from the base start frequency generator 220 and an offset value from the user offset storage 250 to generate the composite frequency. The user offset storage 250 stores the offset value based on the base frequency of the transponder 110 (FIG. 1).

The modulator or demodulator 260 combines the composite frequency with the signal to be transmitted, or the received signal, to generate the signal at the appropriate frequency according to whether the communication unit operates as a transmitter or a receiver, respectively.

Planning Information:

Planning for OFHMA is similar to planning for FDMA. The differences between OFHMA and FDMA include the following:

The channel spacing, thus the allocated bandwidth, for FDMA is typically 1.4*symbol rate which varies for a given user rate with coding/modulation type. In general, OFHMA and FDMA support equivalent user data rates in equivalent bandwidth when rate 1/2 and Reed-Solomon encoding are used with FDMA.

To achieve similar frequency use per user data rate, the allocated bandwidth for OFHMA may be no more than 1.3* symbol rate because OFHMA takes into account an expansion due to the waveform characteristics (e.g., reference symbols and time uncertainty guard time).

The burst rate expansion for OFHMA user rates is equal to the transmission rate in symbols sent over the channel divided by the number of user bits sent over the channel. The expansion rate may be calculated by adding the product of the number of reference symbols per hop times the number of hops per second, to the user rate divided by both encoding rates and by the number of bits in each symbol. Next, this sum is divided by the difference between one second and the product of the time uncertainty guard time per hop times the number of hops per second, and finally dividing by the user rate.

$$A = [\text{hops/sec} \times \text{reference symbols/hop}] +$$
$$[\text{user rate ra} \times (1/FEC1 \text{ rate}) \times (1/FEC2 \text{ rate})]$$

$$B = (1 - \text{hop/sec} \times \text{guard time/hop}) * \text{user rate}$$

Expansion rate=A/B

For example, for a 256,000 user rate, a hop rate of 100 hops per second, 32 reference symbols per hop, 100 µsec guard time per hop, encoding rates of 1/2 and 184/200, and using QPSK modulation which gives two bits per symbol; the burst expansion is:

$$((32 \times 100) + (256,000/(1/2)/(184/200)/2))/$$
$$(1 - 100 \times 100 \times 10^{-6})/256,000 = 1.110562$$

The bandwidth to allocate for a given user is equal to the user rate times the burst expansion times the symbol spacing factor. The symbol spacing factor is variable, ranging from 1.25 to 1.3. For example, for a 256,000 OFHMA link, the bandwidth is 256,000×1.110562×1.3=369,595 Hz, which is a bandwidth efficiency of 0.693 bits per second per Hertz (bps/Hz).

Allocation of Jitter Band:

The full available bandwidth in a BOP is not available for user assignments. Unallocated space is left to accommodate inclusion of "jitter" in the hop frequencies to satisfy security concerns. The jitter space is needed to lower the number of skip zones (to be described later), and to add more users having a bandwidth requirement less then the jitter space. For initial planning, the jitter space may be allocated to about 5% of the bandwidth.

A skip zone (SZ) is a frequency band within the BOP in which a starting hop (for the first user in the group) cannot be placed. If it were, then all users would not fit in the total allocation as they wrap frequency around the top of the BOP to the bottom of the BOP.

A forbidden zone (FZ) is a frequency band in the BOP in which no carrier can be placed, not just the starting hop frequency. These FZ's correspond to the guard space between adjacent transponders.

For all user bandwidths less than the chosen jitter space, there will be no skip zones. There will be at least one skip zone for each user bandwidth in excess of the jitter space. This fact may be used to determine how much jitter space to provide. In a preferred embodiment, a limit of 27 skip zones and 5 forbidden zones is used.

Figure 3:
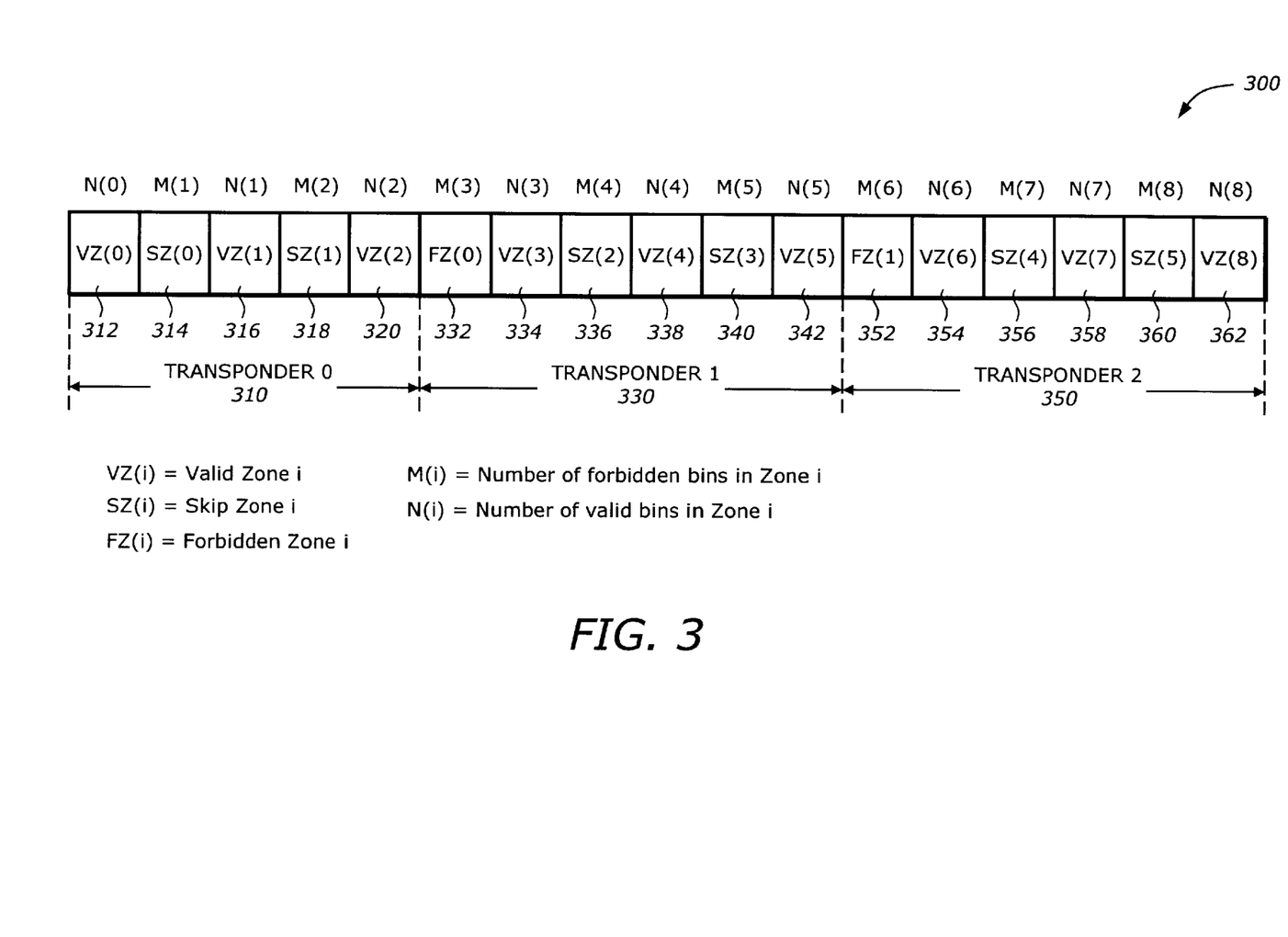
FIG. 3 is a diagram illustrating a frequency allocation according to a preferred embodiment of the invention.

FIG. 3 is a diagram illustrating a frequency band 300 allocated according to a preferred embodiment of the invention. For illustration purposes, only a few frequency subbands and valid, skip, and forbidden zones are shown. The frequency band 300 includes the frequency subbands 310, 330, and 350.

The frequency subbands 310, 330, and 350 correspond to three transponders 0, 1 and 2, respectively. Each frequency band has a number of valid zones (VZ) and skip zones (SZ). In addition, except the first frequency band, all frequency bands have one forbidden zone (FZ). Frequency subband 310 includes valid zones VZ(0) 312, VZ(1) 316, and VZ(2) 320, skip zones SZ(0) 314 and SZ(1) 318. Frequency subband 330 includes a forbidden zone FZ(0) 332, valid zones VZ(3) 334, VZ(4) 338, and VZ(5) 342, and skip zones SZ(2) 336 and SZ(3) 340. Frequency subband 350 includes a forbidden zone FZ(1) 352, valid zones VZ(6) 354, VZ(7) 358, and VZ(8) 362, and skip zones SZ(4) 356 and SZ(5) 360.

Each of the forbidden zones, valid zones, and skip zones had a number of frequency bins. A frequency bin corresponds to a predetermined unit bandwidth. A valid zone VZ(j) has N(j) valid bins in valid zone j. Valid zones VZ(0) 312, VZ(1) 316, VZ(2) 320, VZ(3) 334, VZ(4) 338, VZ(5) 342, VZ(6) 354, VZ(7) 358, and VZ(8) 362 have N(0), N(1), N(2), N(3), N(4), N(5), N(6), N(7), and N(8) valid bins, respectively. A skip zone SZ(j) and a forbidden zone FZ(k) has M(n) forbidden zones in skip zone j or forbidden zone k. As illustrated in FIG. 3, SZ(0) 314, SZ(1) 318, FZ(0) 332, SZ(2) 336, SZ(3) 340, FZ(1) 352, SZ(4) 356, SZ(5) 360 have M(1), M(2), M(3), M(4), M(5), M(6), M(7), and M(8) forbidden bins, respectively.

Adjacent Channel Interference (ACI):

To improve adjacent performance, it is desirable to arrange users based on power (C/kT), which is generally proportional to the user data rate. In a preferred embodiment, all user requests are ordered from low to high data rates and then every second request is taken and allocated in the bandwidth occupancy plan (BOP) to form a bell-shaped bandwidth distribution. The allocation may be adjusted slightly to obtain an acceptable adjacent power differential. This could be modified when the power spectral density (i.e., C/kT normalized to bandwidth) is excessively large from one user to another due to a circuit being received at a disadvantaged terminal which needs more EIRP to achieve the desired Eb/No.

If the BOP less the jitter area is not full, then the unused space is available adjacent to the jitter area. Depending on the size of this unused area, it may be difficult to fit high bandwidth users into it, since they will be adjacent to lower bandwidth users who have lower carrier power. To reduce ACI, some unallocated area with predetermined size may need to be inserted between the last planned user and the start of a new large bandwidth user.

One important parameter for adjacent allocations is the difference in carrier power $P_{dif}$ (in dB) which may be approximated as $E_b/N_o + 10 \log$ (Symbol rate). The difference between adjacent allocations, and the first and last allocation for a fully packed BOP is less than an upper limit. In a preferred embodiment, this upper limit is between 6 dB to 9 dB.

Figure 4:
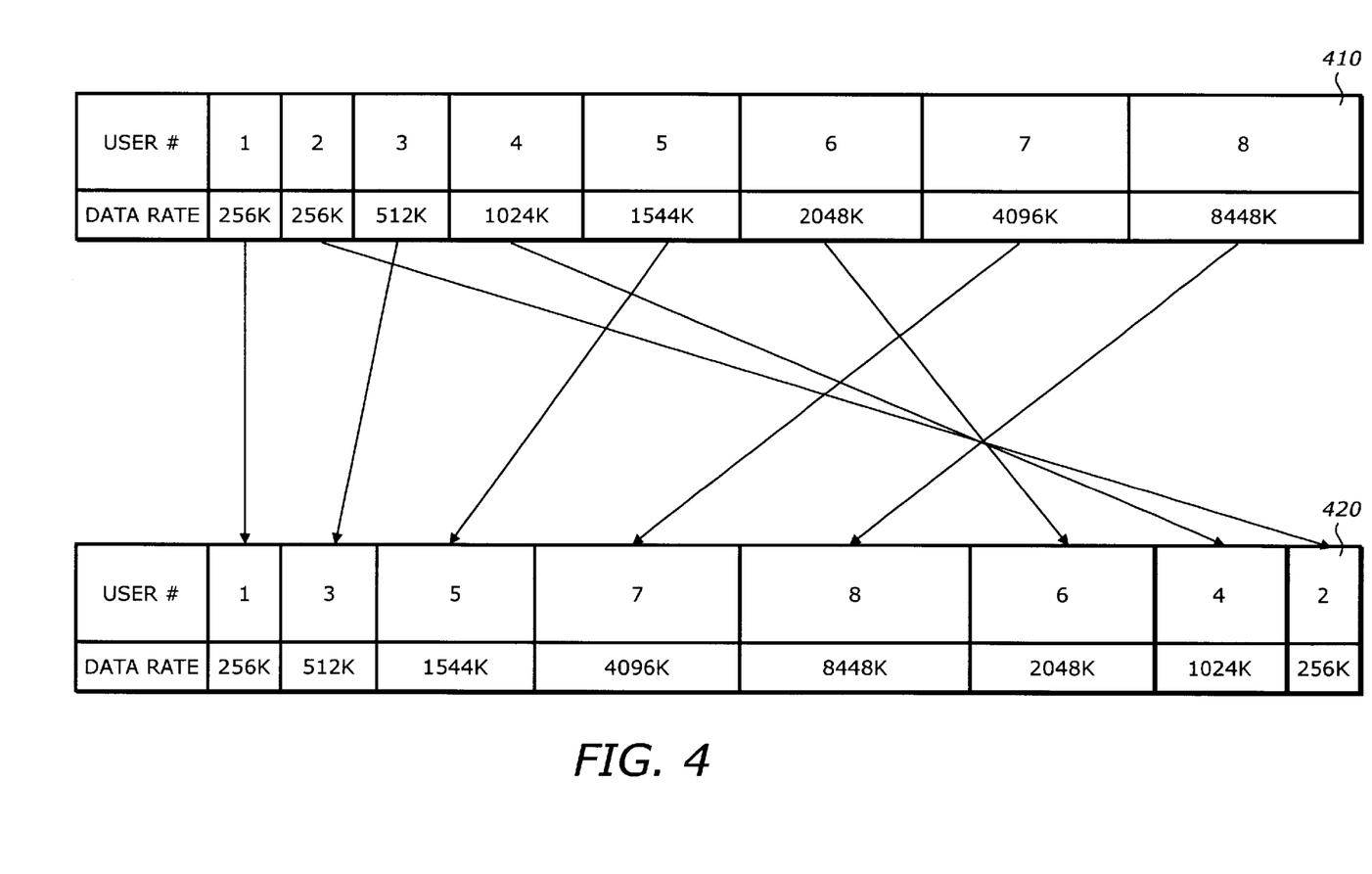
FIG. 4 is a diagram illustrating a frequency allocation based on user data rates according to a preferred embodiment of the invention.

FIG. 4 is a diagram illustrating a frequency allocation based on user data rates according to a preferred embodiment of the invention. The frequency allocation allocated an unallocated frequency band 410 to an allocated frequency band 420.

The unallocated frequency band 410 includes user numbers 1, 2, 3, 4, 5, 6, 7, and 8 having data rates 256K, 256K, 1024K, 1544K, 2048K, 4096K, and 8448K, respectively. The allocation scheme takes every other user request. The allocated frequency band 420 rearranges the user requests in the order 1, 3, 5, 7, 8, 6, 4, 2, corresponding to user data rates 256K, 512K, 1544K, 4096K, 8448K, 2048K, 1024K, and 256K, respectively. The allocation scheme therefore allocates the bandwidths following to a bell-shaped curve. The largest bandwidth is allocated in the middle and the next smaller bandwidths are allocated on the sides.

Hopping Methodology:

For OFHMA, the entire set of users will hop as a unified group. This is also called Time Permuted FDMA or Frequency Circular Shifted FDMA. Because a contiguous frequency range is preferably available for a given user at a given hop time, there are restrictions on what hopping frequencies that can be used.

The user frequency band start location is calculated as a starting base (the lowest frequency in the BOP) plus an offset to the start of a given user band within the BOP, plus a Transmission Security (TRANSEC)-derived random location at a resolution of the synthesizer, as follows:

Fstart=Fbase+Offset+TRANSEC

Fend=Fstart+User BW

The NIP contains, for a given BOP, the Fbase, the BW expansion factor (1.25 to 1.3), and a list of forbidden zones and skip zones. These skip zones are calculated according to the orthogonal frequency hopping process to be described later, and are a function of the layout of users in the BOP. Adding a user will change the skip zones for users who have bandwidth request larger than the jitter space in the BOP. The end of each allocated band is determined using the OFHMA Burst rate for the user data rate and the BW expansion factor.

Orthogonal Frequency Hopping (OFH):

The orthogonal frequency hopping assures that each user can transmit and receive data without interfering with another user. The OFH also allows each communication unit corresponding to each user to process data and/or signals without the need to examine other users' requests in the group. The advantages of the OFH include the minimization of processing time and data size in each communication unit. The OFH is achieved because the frequency is allocated to guarantee that user frequencies are orthogonal when hopping occurs. The frequency hopping is allowed in valid zones of frequency and is not allowed in skip zones and forbidden zones. The OFH therefore is based on a process to determine the skip zones.

A skip zone start is defined when one of the users with bandwidth larger than the jitter space is just one bit of synthesizer resolution too long to fit into the full BOP (including jitter) as the TRANSEC-derived offset is placed in the BOP (i.e., the location of the first user with zero offset into the band). The end of the skip zone is found by continuing to shift the zero offset point farther to the right, i.e., higher frequency, until the start point of the user that will not fit is aligned with the lowest frequency in the jitter space. This assures enough room at the low end to wrap around without tail biting (overlapping) the shifted first user.

Figure 5:
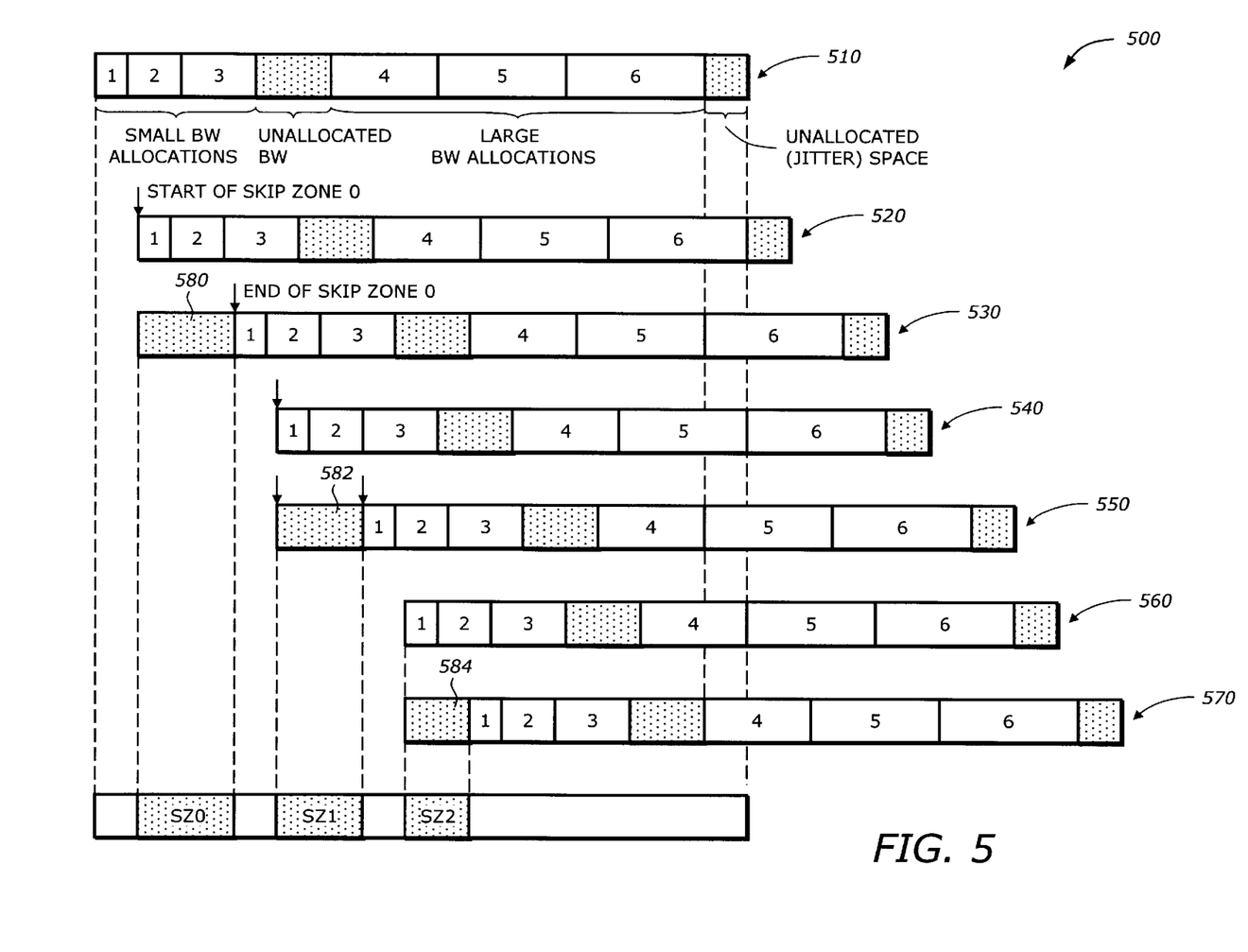
FIG. 5 is a diagram illustrating a determination of skip zones for the OFH according to a preferred embodiment of the invention.

FIG. 5 is a diagram illustrating a determination of skip zones for the OFH according to a preferred embodiment of the invention. The determination of the skip zones is explained by considering a frequency band 510. The frequency band 510 is shifted to the right at successive positions to give shifted frequency bands 520, 530, 540, 550, 560, and 570.

The frequency band 510 has three small bandwidth allocations 1, 2, and 3, an unallocated bandwidth, three large bandwidth allocations 4, 5, and 6, and a jitter space. The frequency band 510 is shifted to the right until the end of the allocation 6 is aligned with the end of the jitter space, resulting in the shifted frequency band 520. At this point, the start of the frequency band 520 marks the start of the first skip zone, skip zone SZ0. The frequency band 510 is next shifted to the right until the beginning of the allocation 6 is aligned with the beginning of the jitter space, resulting in the shifted frequency band 530. At this point, the start of the frequency band 530 marks the end of the first skip zone SZ0.

The frequency band 510 is continuously shifted to the right until the end of the allocation 5 is aligned with the end of the jitter space, resulting in the shifted frequency band 540. At this point, the start of the frequency band 540 marks the start of the second skip zone SZ1. The frequency band 510 is next shifted to the right until the beginning of the allocation 5 is aligned with the beginning of the jitter space, resulting in the shifted frequency band 550. At this point, the start of the frequency band 550 marks the end of the second skip zone SZ1.

The frequency band 510 is continuously shifted to the right until the end of the allocation 4 is aligned with the end of the jitter space, resulting in the shifted frequency band 560. At this point, the start of the frequency band 560 marks the start of the third skip zone SZ2. The frequency band 510 is next shifted to the right until the beginning of the allocation 4 is aligned with the beginning of the jitter space, resulting in the shifted frequency band 570. At this point, the start of the frequency band 570 marks the end of the third skip zone SZ2.

The process is continued until all the skip zones are identified. The resulting skip zones are regions that the start of the frequency band 510 cannot be located. When a frequency hopping occurs, the entire frequency band 510 is shifted to the right and the start of the frequency band 510 is at the frequency hop. If the start of the frequency band 510 is outside the skip zones and the jitter space, the entire allocated bandwidths can be used by all allocated users without overlapping. In other words, the user operational frequencies are orthogonal over the entire allocated frequency band.

Figure 6:
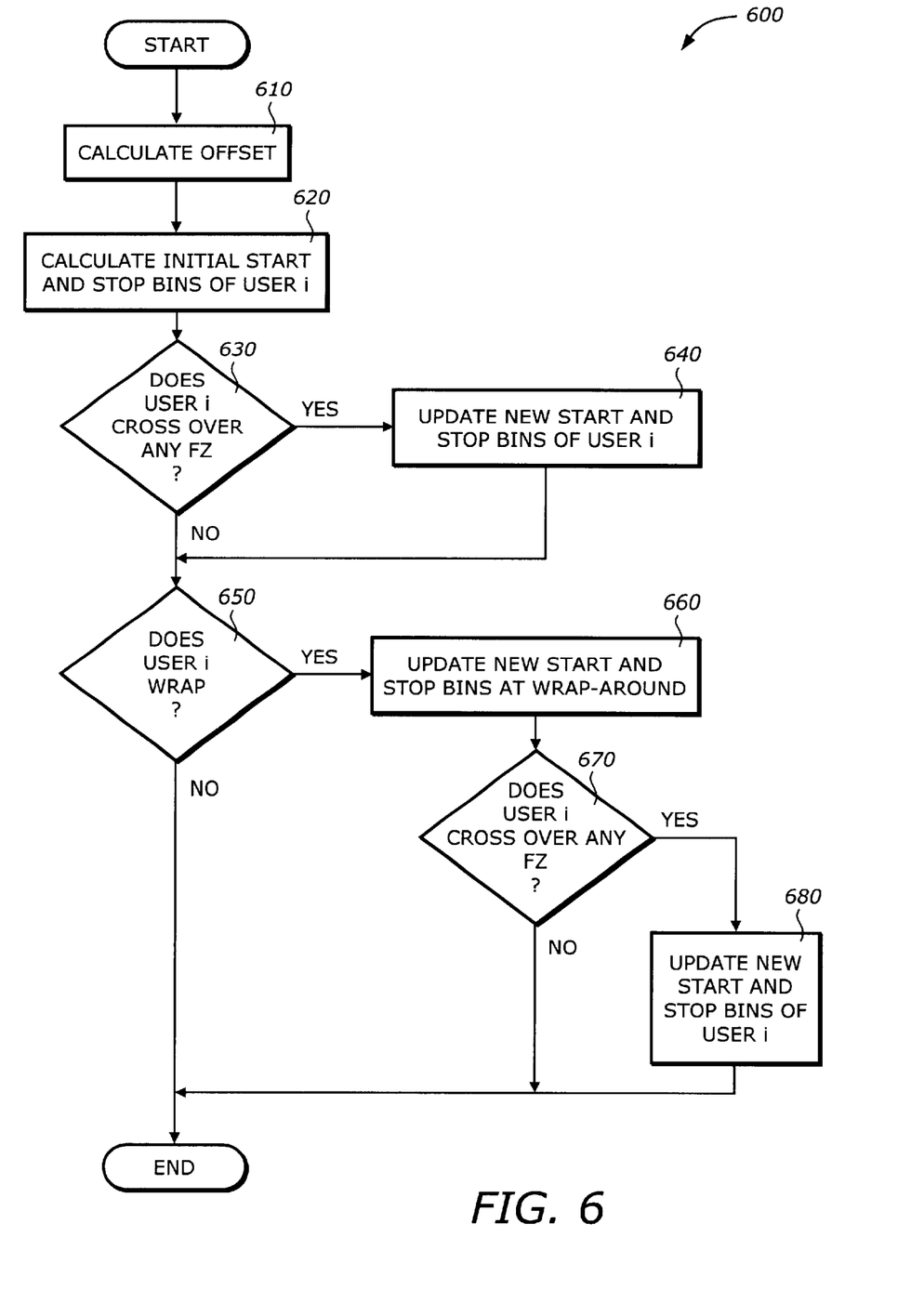
FIG. 6 is a flowchart illustrating a process to determine the skip zones for the OFH according to a preferred embodiment of the invention.

FIG. 6 is a flowchart illustrating a process 600 to determine the skip zones for the OFH according to a preferred embodiment of the invention.

Upon START, the process 600 calculates the offset H' (Block 610). In a preferred embodiment, the offset H' is the TRANSEC generated offset. The offset H' is determined by first calculating H as follows:

$$H=\text{Int}[T*N(K)/2^y] \quad (1)$$

$$\rightarrow N'(k-1)<H<N'(k) \quad (2)$$

Then:

$$H'=M'(k)+H \quad (3)$$

where T is the y-bit TRANSEC word in integer, N(K) is the total number of valid bins in zone k, N'(k) is the number of valid bins from zone 0 to zone k, M'(k) is the total number of forbidden bins from zone 1 to zone k.

The process 600 then proceeds to calculate the initial start and stop bins of user i (Block 620) as follows:

$$\text{user}(i).\text{start}=H'+\text{user}(i).\text{offset} \quad (4)$$

$$\text{user}(i).\text{stop}=\text{user}(i).\text{start}+\text{user}(i).\text{BW} \quad (5)$$

where user(i).start and user(i).stop are the start and stop bins, respectively, of user i; user(i).offset is the number of bins equivalent to offset of user i; user(i).BW is the number of bins equivalent to bandwidth of user i.

Then, the process 600 determines if user i crosses over any forbidden zone (FZ) (Block 630). This determination is carried out by going through all the forbidden zones and determines if user(i).stop is greater or equal to FZ(j).start where FZ(j).start is the start bin of the forbidden zone j. If user i crosses over FZ(j), e.g., user(I).stop>=FZ(j).start, then the process 600 updates the new start and stop bins of user i (Block 640) by performing the following:

$$\text{user}(i).\text{start}=\text{user}(I).\text{start}+\text{jump}(j) \quad (6)$$

$$\text{user}(i).\text{stop}=\text{user}(I).\text{stop}+\text{jump}(j) \quad (7)$$

where jump(j) is the number of bins to jump when hop beyond the transponder j.

If the user i does not cross over any FZ or after the user i is updated in Block 640, the process 600 determines if the user i wraps around (Block 650). This determination is performed by determining if user(i).stop is greater than HopBin, the number of bins equivalent to overall hopping bandwidth. If the user i does not wrap around, e.g., user(i).stop<HopBin, the process 600 is terminated for the current hop.

If the user i wraps around, e.g., user(i).stop>HopBin, the process 600 updates the new start and stop bins at wrap-around by performing the following:

$$\text{user}(i).\text{start}=\text{user}(i).\text{start}+\text{jump}(nSat-1) \quad (8)$$

$$\text{user}(i).\text{stop}=\text{user}(i).\text{stop}+\text{jump}(nSat-1) \quad (9)$$

$$\text{user}(i).\text{start} \%=\text{HopBin} \quad (10)$$

$$\text{user}(i).\text{stop} \%=\text{HopBin} \quad (11)$$

where nSat is the number of transponders which is also equal to the number of FZ+1, and % is the remainder operation.

The process 600 then determines again if the updated user i crosses over any FZ (Block 670). The operations in Block 670 are essentially the same as those in Block 630. If user i does not cross over any FZ, the process 600 is terminated. If user i crosses any FZ, the process 600 updates the start and stop bins of user i (Block 680). The operations in Block 680 are essentially the same as those in Block 640. The process 600 is then terminated.

Multiple Transponder Case:

For the multiple transponder case, each transponder's allocation space has the jitter area taken out. The effective BOP is then formed by concatenating the two or more transponders. Users are then laid into the space, skipping the jitter areas, as efficiently as possible, using the same techniques as for a single transponder.

The offset for a given user that is allocated (with zero TRANSEC offset) to other than the first transponder reflects the addition (back) of the forbidden band frequency difference. The space between transponders in frequency becomes a forbidden zone. Because the characteristics of the transponders and antennas are not expected to be close to each other, a power delta from the nominal value calculated by the system planning computer (SPC) is supplied for each transponder. The CU uses these additional NIP values to adjust transmit power dynamically with each hop.

CU Hopping Process:

The CU contains a process that determines where the starting frequency for the current hop occurs, based on the BOP band definition, skip zones, and forbidden zones. All CU's do the same calculation for the zero-offset TRANSEC-derived low edge, making adjustments, e.g., repositioning in the lower portion of the band, when that frequency falls in a skip zone or their own allocation falls off the edge of the top end of the band.

Dynamic Space Reclamation:

When a circuit is suspended or terminated, its allocation goes into an available pool. The System Planning Computer (SPC) may immediately begin calculation of a new BOP/Circuit allocation set when this occurs, or wait until a need arises. A subsequent dynamic circuit setup request can reclaim that space, or can use formerly unused space, depending on the dynamic request. A BOP change, hence NIP update from the SPC, is required when the dynamic circuit requested bandwidth is larger than the jitter space, because the skip zones need to be updated. The restrictions on the relative carrier power of users placed adjacent to each other due to ACI limitations are also observed.

If the required bandwidth is less than the jitter space, and it will fit in unused bandwidth, then the NCT can approve the MDR dynamic update and simply inform the SPC what was done.

If the required bandwidth is larger, and it will not fit within the largest unallocated band, or the relative carrier power violates the 6 dB limitation, then the Network Control Terminal (NCT) defers approval to the SPC, and the SPC issues a new BOP and Circuit Plan, moving some existing users to defragment the available bandwidth and/or produce a better ACI profile. This can be accomplished with no impact to the user circuits as long as the NIP applicability is in the future and all users in the network switch at the same time. The CU is capable of doing this as long as advance warning is given in time for all network terminal modems to receive the change-over command and the new NIP.

Frequency Planning:

The frequency planning or bandwidth allocation is an iterative process to provide an efficient allocation of bandwidth to as many users as possible.

Figure 7A:
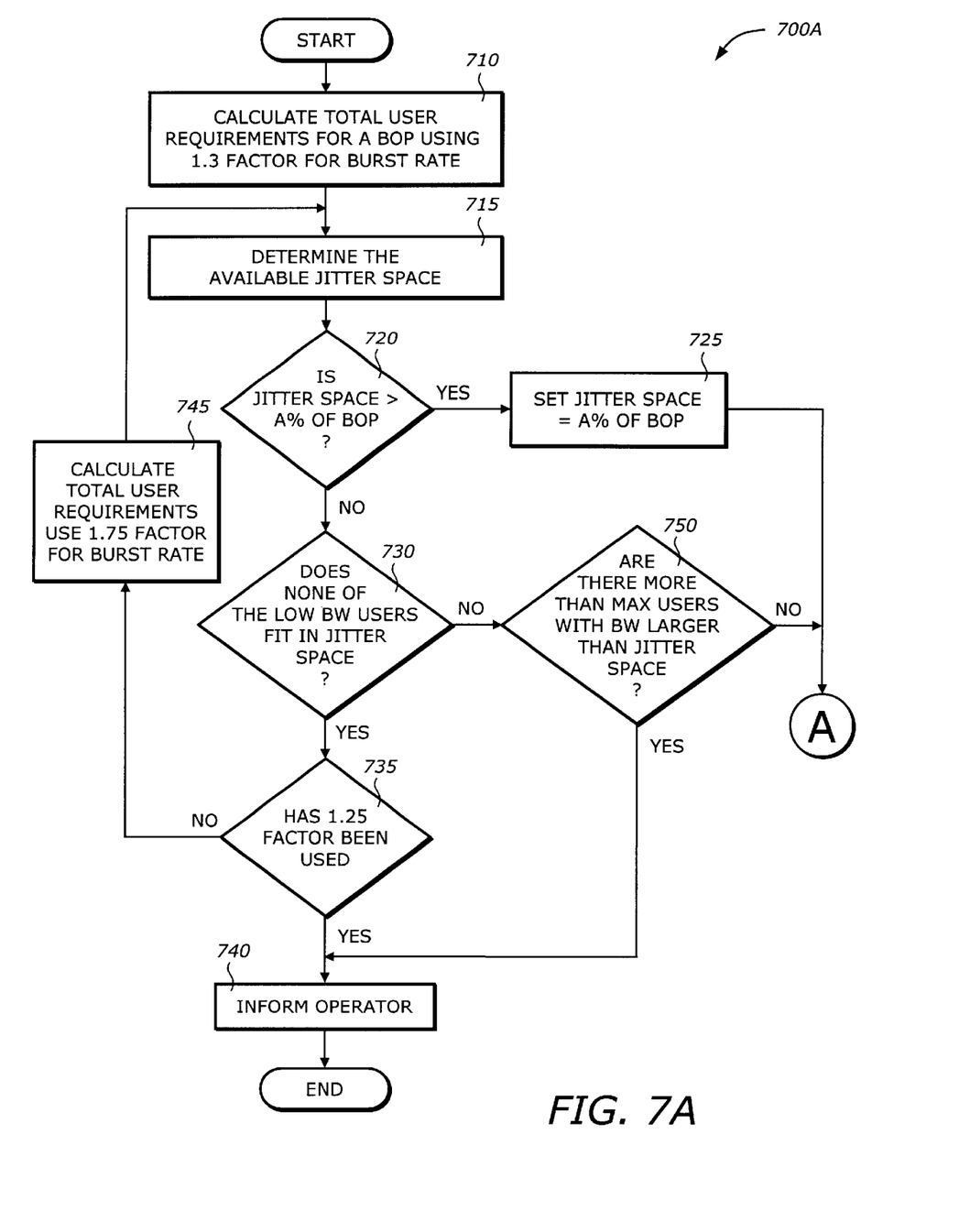
FIG. 7 is a flowchart illustrating a process for frequency planning according to a preferred embodiment of the invention.

FIG. 7A is a flowchart illustrating a process 700A for frequency planning according to a preferred embodiment of the invention.

Figure 7B:
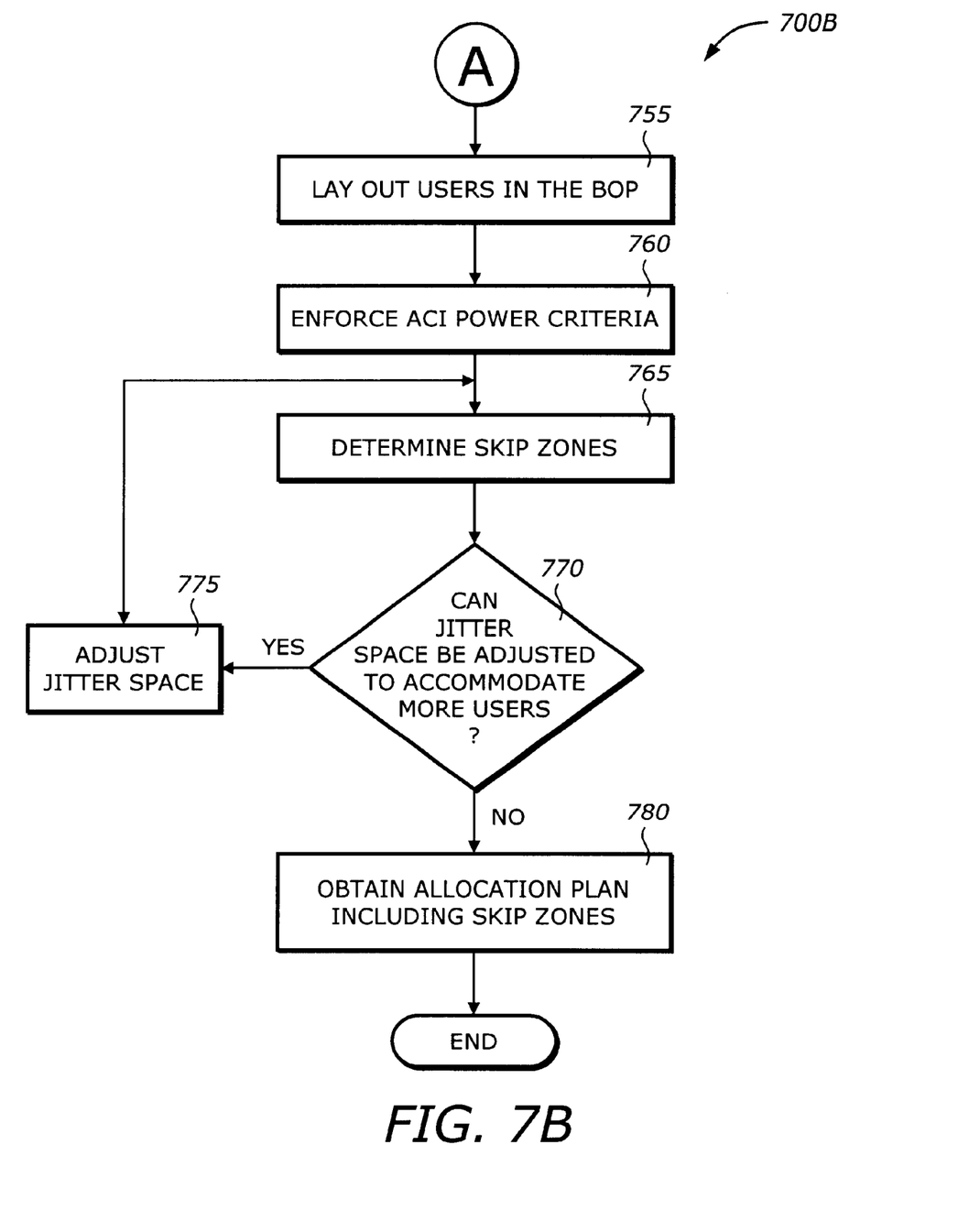

Upon START, the process 700 calculates the total user requirements for a BOP (Block 710). This calculation uses the factor 1.3 for the burst rate, as derived in Table 1. Then, the process 700 determines the available jitter space by subtracting the total user bandwidth from the given BOP (Block 715). The process 700 then determines if this available jitter space is greater than some A % of the BOP where A is a predetermined number (Block 720). In a preferred embodiment, A % is approximately 5%. If the available jitter space is greater than A % of the BOP, the process 700 sets the jitter space to A% (725), and goes to block 755 (FIG. 7B). If the available jitter space is less than or equal to A % of the BOP, the process 700 determines if none of the low bandwidth users fit in the jitter space (Block 730). If true, the process 700 determines if the 1.25 factor has been used for the burst rate (Block 735); otherwise the process 700 goes to block 750. If the 1.25 factor has not been used, the process 700 calculates the total user requirements again using the 1.25 times the burst rate as in Table 1 (Block 745), then goes back to Block 715 to determine the new available jitter space. If the 1.25 factor has already been used, signifying that the current total user requirements cannot be accommodated in the given BOP, the process 700 informs the operator that this is an invalid planning requirement (Block 740) and the process 700 is terminated.

At block 750, the process 700 determines if there are more than MAX users with bandwidth larger than the selected jitter space. In a preferred embodiment, MAX is 27. If there are more than MAX users with bandwidth larger than the selected space, then the planning is invalid, and the process 700 informs the operator (Block 740) and is then terminated. If there are less than MAX users with bandwidth larger than the selected jitter space, then the process 700 goes to Block 755 (FIG. 7B).

FIG. 7B is a flowchart illustrating a process 700B for frequency planning according to a preferred embodiment of the invention. The process 700B is a continuation of the process 700A in FIG. 7A.

In Block 755, the process 700B lays out the users in the BOP. In this lay-out, no users are allocated with the jitter space and unused space is collected near the top of the band adjacent to the jitter space. The process 700B then enforces the adjacent channel interference (ACI) power requirements (Block 760). In a preferred embodiment, this enforcement includes a determination if two adjacent users have a power differential greater than 6 dB (or up to 9 dB maximum limit) from their neighbor including the very first user in the BOP and any user placed adjacent to the "jitter space" at the top.

The process 700B then determines the skip zones (Block 765) using the process described above. Next, the process 700B determines if the jitter space can be adjusted to accommodate more users (Block 770). If yes, the process 700B adjusts the jitter space accordingly for more users (Block 775) and then goes back to determine the skip zones based on the newly added users (Block 765). If the jitter space cannot be adjusted, the process 700B builds the BOP and the NIP circuit table, including the skip zones (Block 780). The process 700B is then terminated Thus, the present invention provides a technique for frequency planning and allocation using orthogonal frequency hopping. The technique provides efficient bandwidth allocation and fast processing time for user communication units.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method to provide orthogonal frequency hopping for users in a communication system, the users having user bandwidths allocated on a first frequency band, the method comprising:

providing a jitter space with a jitter bandwidth and a lowest jitter frequency on the allocated first frequency band; and determining a skip zone separate from the jitter space for at least one of the user bandwidths when the at least one of the user bandwidths is larger than the jitter space, the skip zone corresponding to a second frequency band, within the first frequency band, not occupied by a starting hop of the user bandwidths when the user bandwidths are shifted in a frequency hopping, the skip zone having an end corresponding to start of the at least one of the user bandwidths aligned with the lowest jitter frequency.

2. The method of claim 1 further comprising:

allocating the user bandwidths such that a difference between adjacent carrier powers is less than a predetermined power level.

3. The method of claim 1 further comprising:

providing a forbidden zone between adjacent frequency bands used by corresponding transponders, the forbidden zone being unoccupied by the user bandwidths.

4. The method of claim 3 further comprising:

determining valid zones in the first frequency band wherein when the starting hop of the user bandwidths is located in the valid zones, the entire user bandwidths fitting within the frequency band.

5. A method for planning user bandwidths in a first frequency band, the method comprising:

determining a user bandwidth having a jitter space with a lowest jitter frequency; and updating the user bandwidth a first time when the user bandwidth crosses an invalid zone, the invalid zone including a skip zone separate from the jitter space, the skip zone corresponding to a second frequency band, within the first frequency band, not occupied by a starting hop of the user bandwidth when the user bandwidths are shifted in a frequency hopping, the skip zone having an end corresponding to start of the user bandwidths aligned with the lowest jitter frequency, and updating the user bandwidth at wrap-around when the once updated user bandwidth wraps around the frequency band.

6. The method of claim 5 wherein the invalid zone further includes a forbidden zone.

7. The method of claim 6 wherein the forbidden zone is between adjacent frequency bands used by corresponding transponders, the forbidden zone being unoccupied by the user bandwidths.

8. The method of claim 5 wherein determining a user bandwidth comprises:

calculating an offset; and calculating an initial start bin and an initial stop bin based on the offset, the initial start and stop bins corresponding to the user bandwidth.

9. The method of claim 5 further comprising:

if the updated user bandwidth crosses the invalid zone, updating the user bandwidth a second time.

10. An apparatus for providing an operational frequency in a first frequency band having a jitter space with a lowest jitter frequency, the frequency band being allocated to user bandwidths, the apparatus comprising:

a random generator to provide a random index when a frequency hopping occurs;

a network implementation plan (NIP) parameter storage to provide orthogonal frequency hopping (OFH) parameters, the OFH parameters including a skip zone list having skip zones separate from the jitter space, each of the skip zones corresponding to a second frequency band, within the first frequency band, not occupied by a starting hop of at least one of the user bandwidths when the user bandwidths are shifted in the frequency hopping, each of the skip zones having an end corresponding to start of the at least one of the user bandwidths aligned with the lowest jitter frequency; and a frequency generator coupled to the random generator to generate the operational frequency based on the random index, the operational frequency being orthogonal to other user frequencies in the first frequency band.

11. The apparatus of claim 10 wherein the OFH parameters further include a valid zone list and a forbidden zone list.

12. The apparatus of claim 11 wherein the valid zone list includes valid zones, the valid zones providing frequency region for a starting hop of the user bandwidths when the frequency hopping occurs.

13. The apparatus of claim 12 wherein the forbidden zone list includes forbidden zones the skip and forbidden zones providing frequency regions that are not available for a starting hop of user bandwidths when the frequency hopping occurs.

14. A system comprising:

at least a transponder operating at a first frequency band; and a communication unit for providing an operational frequency in the first frequency band having a jitter space with a lowest jitter frequency, the first frequency band being allocated to user bandwidth, the communication unit comprising:

a random generator to provide a random index when a frequency hopping occurs, a network implementation plan (NIP) parameter storage to provide orthogonal frequency hopping (OFH) parameters, the OFH parameters including a skip zone list having skip zones separate from the jitter space, each of the skip zones corresponding to a second frequency band, within the first frequency band, not occupied by a starting hop of the user bandwidth when the user bandwidths are shifted in the frequency hopping, each of the skip zones having an end corresponding to start of the user bandwidths aligned with the lowest jitter frequency, and a frequency generator coupled to the random generator to generate the operational frequency based on the random index, the operational frequency being orthogonal to other user frequencies in the first frequency band.

15. The system of claim 14 wherein the OFH parameters further include a valid zone list and a forbidden zone list.

16. The system of claim 15 wherein the valid zone list includes valid zones, the valid zones providing frequency region for a starting hop of user bandwidths when the frequency hopping occurs.

17. The system of claim 16 wherein the forbidden zone list includes forbidden zones, the skip and forbidden zones providing frequency regions that are not available for a starting hop of user bandwidths when the frequency hopping occurs.

18. A method for orthogonal frequency hopping, the method comprising:

operating at least a transponder at a first frequency band having a jitter space with a lowest jitter frequency; and providing an operational frequency in the first frequency band for a communication unit, the first frequency band being allocated to user bandwidths, providing an operational frequency comprising:
   providing a random index by a random generator when a frequency hopping occurs,
   providing orthogonal frequency hopping (OFH) parameters by a network implementation plan (NIP) parameter storage, the OFH parameters including a skip zone list having skip zones separate from the jitter space, each of the skip zones corresponding to a second frequency band, within the first frequency band, not occupied by a starting hop of at least one of the user bandwidths when the user bandwidths are shifted in the frequency hopping, each of the skip zones having an end corresponding to start of the at least one of the user bandwidths aligned with the lowest jitter frequency, and
   generating the operational frequency by a frequency generator based on the random index, the operational frequency being orthogonal to other user frequencies in the frequency band.

19. The method of claim 18 wherein the OFH parameters further include a valid zone list and a forbidden zone list.

20. The method of claim 19 wherein the valid zone list includes valid zones, the valid zones providing frequency region for a starting hop of user bandwidths when the frequency hopping occurs.

21. The method of claim 20 wherein the forbidden zone lists includes forbidden zones, the skip and forbidden zones providing frequency regions that are not available for a starting hop of user bandwidths when the frequency hopping occurs.

\* \* \* \* \*